US009647483B1

(12) United States Patent
Bana et al.

(10) Patent No.: US 9,647,483 B1
(45) Date of Patent: May 9, 2017

(54) CLOSED MAGNETIC WIRELESS POWER TRANSFER SYSTEM

(71) Applicant: The United States of America as represented by the Secretary of the Navy, Washington, DC (US)

(72) Inventors: Viktor Bana, San Diego, CA (US); Greg Anderson, San Diego, CA (US); Alex Phipps, San Diego, CA (US); Doeg Rodriguez, San Diego, CA (US); John D. Rockway, San Diego, CA (US); Peder Hansen, San Diego, CA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 135 days.

(21) Appl. No.: 14/754,471

(22) Filed: Jun. 29, 2015

(51) Int. Cl.
*H01M 10/46* (2006.01)
*H02J 7/02* (2016.01)
*H02J 5/00* (2016.01)

(52) U.S. Cl.
CPC .............. *H02J 7/025* (2013.01); *H02J 5/005* (2013.01)

(58) Field of Classification Search
CPC .......... H02J 7/0042; H02J 7/355; H02J 5/005; H02J 7/025
USPC ......................... 320/107, 108, 114, 115, 104
See application file for complete search history.

(56) References Cited

U.S. PATENT DOCUMENTS

| | | | | |
|---|---|---|---|---|
| 9,419,468 B1 * | 8/2016 | Pierson | H02J 7/025 | |
| 2010/0231340 A1 * | 9/2010 | Fiorello | H01F 38/14 | 336/92 |
| 2011/0115429 A1 * | 5/2011 | Toivola | H01F 38/14 | 320/108 |
| 2013/0119773 A1 | 5/2013 | Davis | | |

(Continued)

FOREIGN PATENT DOCUMENTS

EP 2304859 A2 4/2011

OTHER PUBLICATIONS

EP 2304859 A2 (Apr. 6, 2011) English Translation from Google.*

(Continued)

*Primary Examiner* — Edward Tso

(74) *Attorney, Agent, or Firm* — SPAWAR Systems Center Pacific; Kyle Eppele; Ryan J. Friedl

(57) ABSTRACT

A wireless power transfer system includes a receive coil system nested within a transmit coil system forming a closed magnetic circuit. The transmit coil system includes a non-planar tapered transmit coil disposed within a tapered ferrite housing and a layer of insulating material surrounding the non-planar tapered transmit coil and the tapered ferrite housing. The receive coil system includes a ferrite plug comprising a column portion centrally secured to a plate portion, a non-planar receive coil wound around the column portion, a layer of insulating material surrounding the column portion and the non-planar receive coil, and a hemispherical covering surrounding the insulated column portion and non-planar receive coil. The non-planar receive coil has a smaller diameter than the non-planar tapered transmit coil. The maximum outside diameter of the hemispherical covering is less than or equal to the minimum inside diameter of the non-planar tapered transmit coil.

17 Claims, 3 Drawing Sheets

(56) References Cited

U.S. PATENT DOCUMENTS

| | | | | |
|---|---|---|---|---|
| 2014/0091756 | A1* | 4/2014 | Ofstein | H02J 5/005<br>320/108 |
| 2015/0222129 | A1* | 8/2015 | McCauley | H02J 5/005<br>307/104 |
| 2016/0094051 | A1* | 3/2016 | Soar | H02J 5/005<br>307/9.1 |
| 2016/0285298 | A1* | 9/2016 | Olgun | H02J 7/027 |

OTHER PUBLICATIONS

Zhou, Jie et al., "Frequency selection of an inductive contactless power transmission system for ocean observing", Ocean Engineering, vol. 60, pp. 175-185, 2013.

Wait, James R., "Insulated Loop Antenna Immersed in a Conducting Medium", Journal of Research of the National Bureau of Standards, vol. 59, No. 2, pp. 133-137, Aug. 1957.

* cited by examiner

CLOSED MAGNETIC WIRELESS POWER TRANSFER SYSTEM

FEDERALLY-SPONSORED RESEARCH AND DEVELOPMENT

The Closed Magnetic Wireless Power Transfer System is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 102753.

BACKGROUND

In the ocean, there are a multitude of underwater sensor nodes collecting data such as salinity and temperature. All these sensors require constant service in order to replace the battery to maintain operation. A primary method of charging these sensors is to remove them from the water, replace the battery, and re-deploy the system. However, this results in unwanted lapses in operation as well as high maintenance cost.

Another option is to charge the sensor in situ through wireless power transfer. Wireless power transfer systems are available in the consumer market for charging consumer electronics. They typically use a planar transmit coil to wirelessly transfer power to a planar receive coil, which then charges a battery in the electronics. While this configuration is manageable for charging consumer electronics, it is not functional for charging within the ocean environment, as there are several challenging aspects of charging in underwater environments.

One such challenging aspect is alignment of the coils, which is important for maximizing electromagnetic coupling. Ocean currents cause the coils to drift apart resulting in misalignment inefficiencies or greater standoff distances. Another challenging aspect is bio-fouling. Coils will heat up due to the electrical current passing through the coils. The heating will increase bio-fouling growth on the coils resulting in greater and greater standoff distances. The increased distances result in poor power transfer efficiency.

A further issue presented in the underwater environment is that ocean saltwater is a highly electrically conductive medium. This creates a number of issues including lowering possible frequencies of operation, higher coil radiation resistance, and eddy current losses. Each of these issues results in poor power transfer efficiency. The high electrical conductivity (4 S/m) of ocean saltwater limits the frequency of operations because of skin depth. Additionally, there is an increase in radiation resistance for coils in saltwater as the presence of ocean water increases the radiation resistance of the loop. For the coil in saltwater, the radiation resistance is very high, much higher than the other resistances that are present. Also, the coils suffer from eddy current losses in the ocean water. These eddy current losses are formed from small magnetic loops that run counter to the loop formed in the coils.

The obstacles discussed above result in poor charging efficiencies, which lead to longer charging times. A system and method are needed to address the above shortcomings and provide an efficient means for wireless power transfer in an underwater environment.

DETAILED DESCRIPTION OF SOME EMBODIMENTS

The subject matter disclosed herein involves a system for a closed, magnetic, wireless power transfer circuit that provides high power transfer efficiency at various depths within the ocean. This disclosed subject matter enables power transfer requirements of less than 10 W with high power transfer efficiency for charging of underwater devices and sensor nodes, with a general operating frequency of between 100 kHz and 500 kHz.

The disclosed system uses transmit and receive coil systems. Each coil system represents half of a magnetic circuit. Wireless power transfer is enabled when, for example, a charging node (which contains one coil system) makes a connection with, for example, a sensor node (which contains the other coil system), closing the magnetic circuit. The connection is not a "hard" connection, but a "soft" connection that aligns the coils and allows for standoff distances. The magnetic field shaping created by the design of the receive coil system and the transmit coil system allows for high power transfer efficiency.

Figure 1:
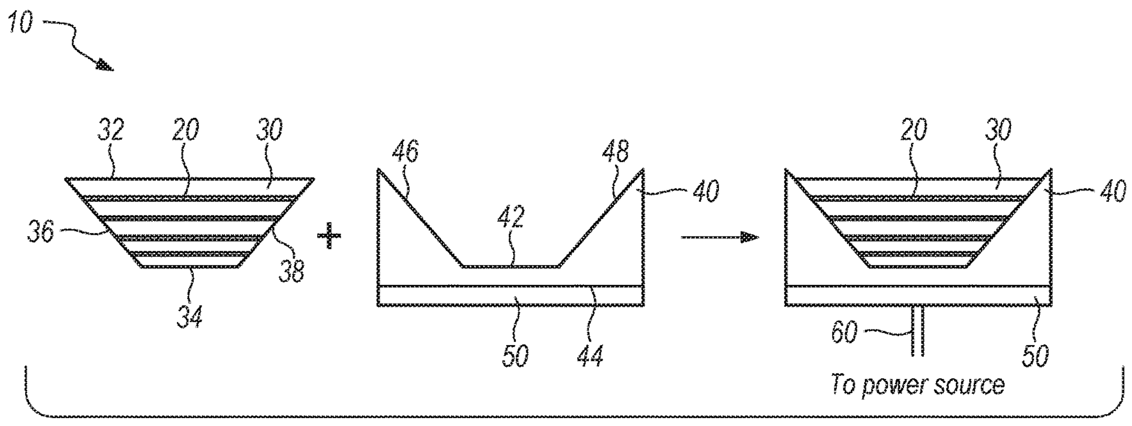
FIG. 1 shows a diagram of an embodiment of an insulated transmit coil system in accordance with the Closed Magnetic Wireless Power Transfer System.
Figure 2:
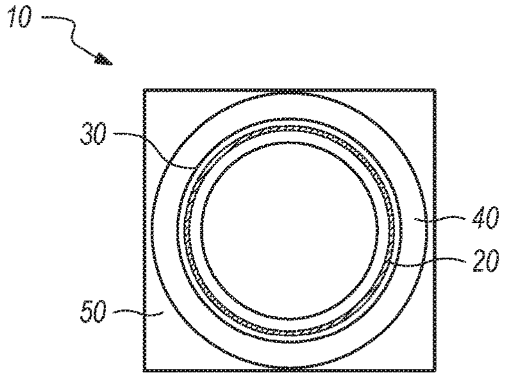
FIG. 2 shows a top view of the system shown in FIG. 1.

Referring to FIGS. 1 and 2, FIG. 1 shows a diagram 10 of an embodiment of an insulated transmit coil system in accordance with the Closed Magnetic Wireless Power Transfer System, while FIG. 2 shows a top view of the system shown in FIG. 1. The transmit coil system includes a non-planar tapered transmit coil 20 secured within potting structure 30 having a first end 32, second end 34, first side 36, and second side 38. Sides 36 and 38 are tapered from first end 32 to second end 34. Coil 20 and potting structure 30 are disposed within a tapered ferrite housing 40 having a top surface including a bottom portion 42, a first side 46, and a second side 48, and a bottom surface 44. Sides 46 and 48 are tapered to match the taper of sides 36 and 38 of potting structure 30, allowing for coil 20 and potting structure 30 to be securely disposed within tapered ferrite housing 40.

In some embodiments, a layer of insulating material (not shown) surrounds transmit coil 20 and tapered ferrite housing 40. As an example, the insulating material may be a clear urethane material. The transmit coil system may further include an electromagnetic shielding plate 50 coupled to the distal end of the ferrite housing, bottom side 44. As an example, shielding plate 50 may comprise aluminum. As an example, the transmit coil system may be connected to a power source (see FIG. 7) via a cable 60 that runs through the bottom of tapered ferrite housing 40.

An example method to form the transmit coil system will now be discussed. To form transmit coil 20, a bobbin is first constructed to form the coil's tapered frame. Then the coil is wound around a gimbbet, which fit snuggly inside the bobbin. The coil is wound with wire, such as litz wire, with 10 to 15 turns resulting in an inductance of roughly 10 to 20 μH. Tapered ferrite housing 40 is first formed on a wooden frame to exactly fit tapered transmit coil 20. Then ferrite plates are fixed to the wound frame to form tapered ferrite housing 40. A hole in the bottom of ferrite housing 40 allows the ends of the litz wire to be threaded through. A potting structure 30, such as a clear urethane material, may then be used to pot transmit coil 20 and ferrite housing 40 together. This potting material acts as an insulator for transmit coil 20, which helps enable the performance of transmit coil 20 and also protects tapered ferrite housing 40 and transmit coil 20 from the ocean environment.

An underwater cable is also attached to the ends of the litz wire. Tapered ferrite housing 40 and transmit coil 20 are then placed on top of a shielding plate 50, such as an aluminum plate. Shielding plate 50 is used for electromagnetic shielding to protect other circuits that might be present from magnetic fields. A hole is also placed in shielding plate 50 to thread the underwater cable. This entire transmit coil system can then be affixed, for example, to an underwater power source (see FIG. 7) or to a UUV (see FIG. 8).

Figure 3:
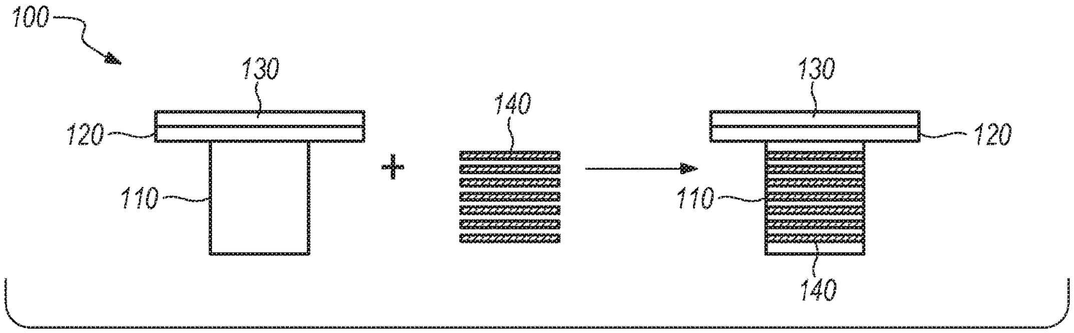
FIG. 3 shows a diagram of an embodiment of a non-planar receive coil wound around a ferrite plug for use in a receive coil system in accordance with the Closed Magnetic Wireless Power Transfer System.

FIG. 3 shows a diagram 100 of an embodiment of a non-planar receive coil wound around a ferrite plug for use in a receive coil system in accordance with the Closed Magnetic Wireless Power Transfer System. The ferrite plug includes a column portion 110 centrally secured to a plate portion 120. In some embodiments, plate portion 120 includes an electromagnetic shielding plate 130 coupled to distal end of plate portion 120. A non-planar receive coil 140 is wound around column portion 110. The positioning of receive coil 140 on the ferrite plug helps to ensure the necessary inductance required for operation. This requires consideration of the radius and/or height of receive coil 140 along with the ferrite material. Receive coil 140 is optimally configured to have a smaller diameter and height than transmit coil 20. In some embodiments, a layer of insulating material (not shown), such as a clear urethane material, surrounds column portion 110 and receive coil 140.

Figure 4:
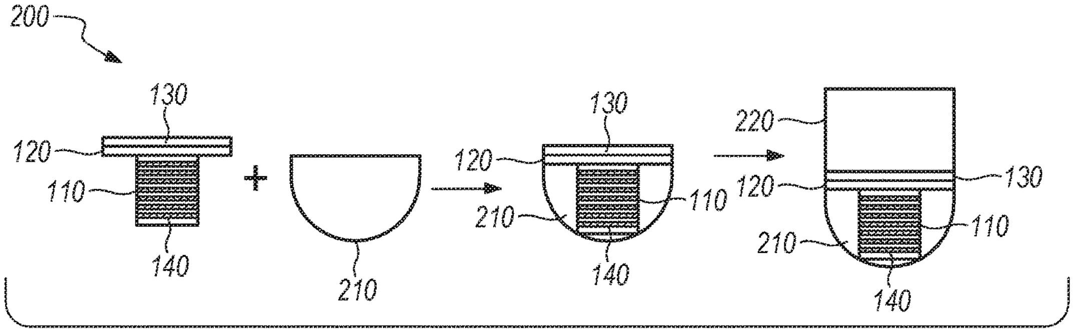
FIG. 4 shows a diagram of an embodiment of an insulated receive coil system connected to a device in accordance with the Closed Magnetic Wireless Power Transfer System.

FIG. 4 shows a diagram 200 of an embodiment of an insulated receive coil system connected to a device in accordance with the Closed Magnetic Wireless Power Transfer System. As shown in FIG. 4, a hemispherical covering 210 is secured to the ferrite plug and receive coil from FIG. 3 to surround the insulated column portion and non-planar receive coil. As an example, the hemispherical covering may be a high-pressure polymer material. The maximum outside diameter of hemispherical covering 210 is less than or equal to the minimum inside diameter of transmit coil 20. After hemispherical covering 210 is secured, the resulting system can be attached to a device 220, such as a UUV operating in an underwater environment, or to the underside of a buoy.

An example method to form the receive coil system will now be discussed. First, a ferrite circular plug is provided. The ferrite plug may comprise a ferrite circular column 110 atop a ferrite plate 120. This ferrite plug is then fixed to a shielding plate 130 for electromagnetic shielding. Litz wire is wound around the ferrite plug to form a receive coil 140 for the receive coil system. Receive coil 140 is designed with ferrites in mind to shape the magnetic field out of receive coil 140 and down and away from shielding plate 130.

After the receive coil system formed, it is then potted. Next, as shown in FIG. 4, the ferrite receive coil is placed inside an insulating hemispherical covering 210. Duroid or other high pressure plastics are suitable materials for hemispherical covering 210. The insulating hemisphere covering 210 provides two roles. First it protects receive coil 140 from pressures at deep ocean depth. Second, insulating hemisphere covering 210 assists to minimize the radiation resistance in receive coil 140. For example, the use of an insulated coil helps to minimize radiation resistance within the design frequencies of interest from 100 kHz to 500 KHz.

Figures 5A, 5B, 5C:
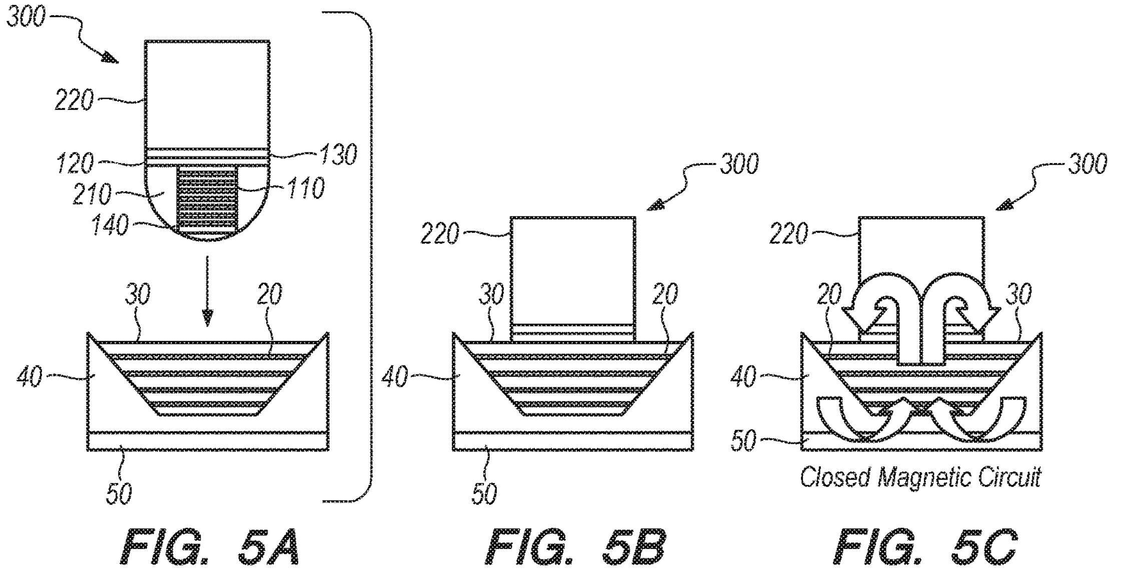
FIGS. 5A-5C show diagrams illustrating the nesting of a receive coil system within a transmit coil system to form a closed magnetic circuit in accordance with the Closed Magnetic Wireless Power Transfer System.

FIGS. 5A-5C show diagrams 300 illustrating the nesting of a receive coil system within a transmit coil system to form a closed magnetic circuit in accordance with the Closed Magnetic Wireless Power Transfer System. The use of a non-planar coil geometry helps allow for a "soft" connection between the transmit coil system and the receive coil system. As shown in FIG. 5A, the receive coil system attached to a device, as shown in FIG. 4, is positioned above the transmit coil system as shown in FIGS. 1 and 2. FIG. 5B then shows the nesting of the receive coil system within the transmit coil system. FIG. 5C shows the closed magnetic circuit formed and the general magnetic flux lines as shown by the arrows. When the circuit is formed, power from a power source, such as shown in FIG. 7, may be transmitted from the transmit coil system to the receive coil system secured to device 220.

Although in FIGS. 5A-5C the receive coil system is shown secured to a device 220 such as a UUV and the transmit coil system is to be connected to a power source, it is well within the scope of the subject matter disclosed herein to reverse the roles. Accordingly, a transmit coil system can be secured to a device, such as device 220, and the receive coil system can be connected to device that requires power for operation, such as an underwater sensor node (see FIG. 8).

Figure 6:
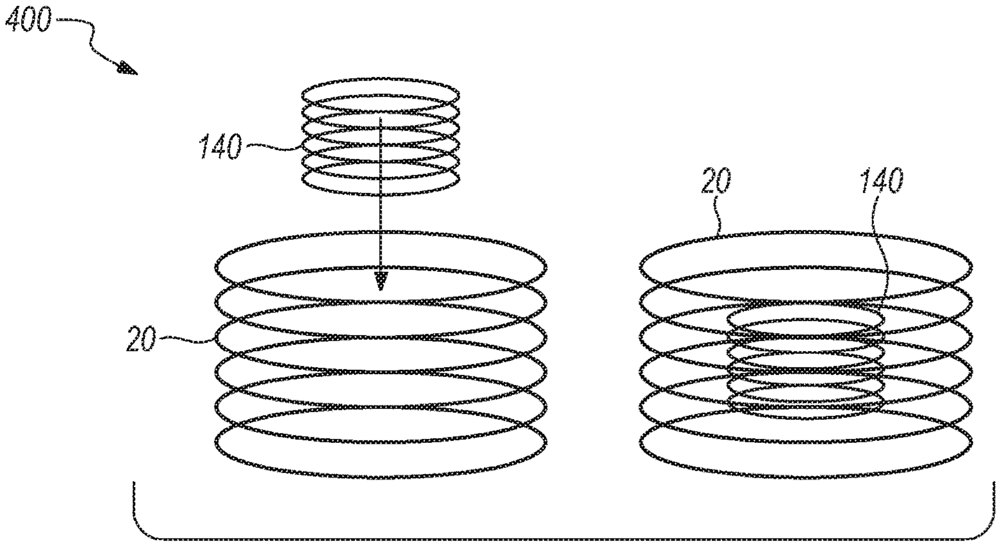
FIG. 6 shows a diagram illustrating the positioning of the receive coil within the transmit coil when in a nested configuration in accordance with the Closed Magnetic Wireless Power Transfer System.

FIG. 6 shows a diagram 400 illustrating the positioning of the receive coil 140 within the transmit coil 20 when in a nested configuration in accordance with the Closed Magnetic Wireless Power Transfer System. The diagram on the left shows the positioning of receive coil 140 above transmit coil 20 when the systems are positioned as shown in FIG. 5A. The diagram on the right shows the positioning of receive coil 140 within transmit coil 20 when the systems are positioned as shown in FIGS. 5B and 5C. In some embodiments, the systems are configured such that the vertical midpoint of receive coil 140 is substantially aligned with the vertical midpoint of transmit coil 20, as shown.

Figure 7:
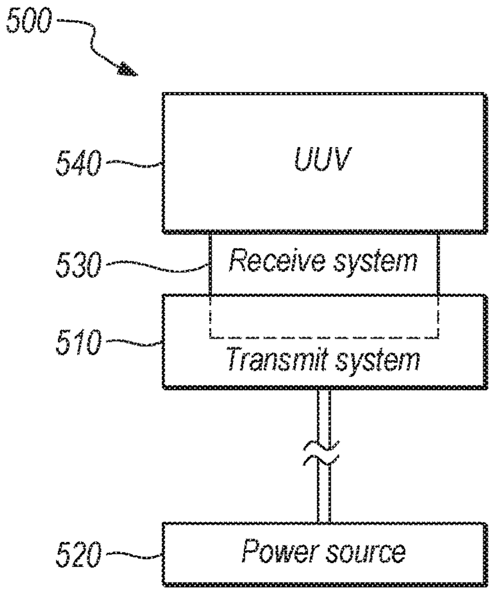
FIG. 7 shows a diagram illustrating a system in accordance with the Closed Magnetic Wireless Power Transfer System where the transmit coil system is connected to a power source and the receive coil system is connected to an unmanned underwater vehicle (UUV).

FIG. 7 shows a diagram 500 illustrating a system in accordance with the Closed Magnetic Wireless Power Transfer System where the transmit coil system 510 is connected via a cable to a power source 520 and the receive coil system 530 is connected to a UUV 540. As an example, power source 520 may comprise any source of power, such as one or more batteries, along with associated circuitry as would be recognized by a person having ordinary skill in the art. Also, UUV may be, for example, any device configured to operate in an underwater environment, whether manually or remotely controlled. As such, it should be recognized that UUV 540 may be replaced with an underwater manned vehicle having a receive coil system 530 coupled thereto. As a further example, rather than connected to a UUV, receive coil system 530 may be securely connected to the underside of a buoy having electronics thereon, wherein power is transferred from power source 520 to the buoy electronics via transmit coil system 510 and receive coil system 530.

Figure 8:
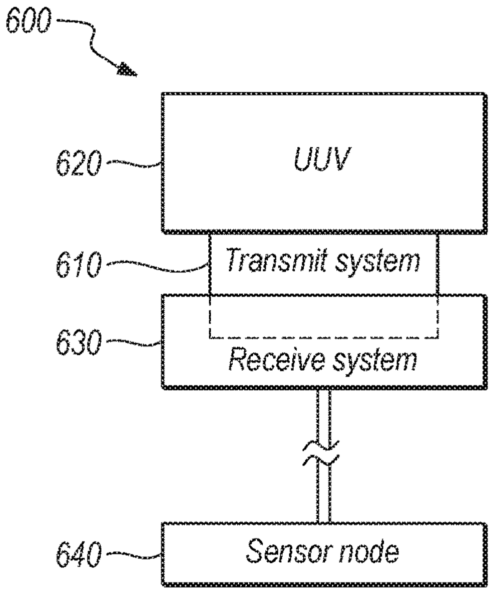
FIG. 8 shows a diagram illustrating a system in accordance with the Closed Magnetic Wireless Power Transfer System where the transmit coil system is connected to a UUV and the receive coil system is connected to a sensor node.

FIG. 8 shows a diagram 600 illustrating a system in accordance with the Closed Magnetic Wireless Power Transfer System where the transmit coil system 610 is connected to a UUV 620 and the receive coil system 630 is connected to an underwater sensor node 640. As an example, sensor node 640 may comprise any type of sensor, such as a salinity or temperature sensor. Further, sensor node 640 may be either fixed or moveable within the underwater environment.

The disclosed subject matter provides a system that helps to ensure maximum power transfer efficiency while operating in an underwater environment. As discussed below, this is accomplished by maximizing the coupling between transmit coil 20 and receive coil 140 resulting in higher power transfer efficiencies, reducing eddy current losses by stray magnetic fields, and minimizing radiation resistances caused by underwater operation.

Wireless power transfer requires high magnetic coupling between coils. If there is poor magnetic coupling, then there is poor transfer efficiency. One aspect of the design helps improve magnetic coupling is that receive coil 140 is smaller in radius than transmit coil 20 (or vice versa if roles are switched). Another aspect is that receive coil 140 is inserted into transmit coil 20 (or vice versa) and the two coils are aligned. The key advantage of the smaller coil slotted inside the larger coil is that it leads to extremely high magnetic coupling because of the concentration of magnetic flux between the two coils. This magnetic flux is then captured by the smaller receive coil resulting in higher efficiencies.

Even in the nested configuration however, the two coils by themselves still leak magnetic field out the ends of the coil. As a result, use of the ferrite plug and ferrite housing helps to push the magnetic field back into the concentrated region between the two coils resulting in higher magnetic coupling. This is how the magnetic circuit is closed when the receive coil system and the transmit coil system connect, resulting in maximum magnetic field coupling between the two coils and leading to maximum power transfer efficiency.

Eddy current losses are generated by stray magnetic fields created by a transmitting coil. These stray magnetic fields create current loops in the conducting medium, which oppose the desired current loops formed on the receiving coil. These opposing currents create a resistance or eddy current loss. To reduce the eddy current loss, the disclosed subject matter aims to maintain distances and frequency of operations well below the skin depth requirement. The second design aspect used is to shape the magnetic field so that it remains closely confined between transmit coil 20 and receive coil 140. This is performed by the coils being wound around the ferrite housing and ferrite plugs creating a closed magnetic circuit. It reduces the stray magnetic field leaked out into the ocean, which would generate the eddy current loss. Additionally, this design aspect maximizes the magnetic field between the two coils resulting in high coupling and higher power transfer efficiencies.

The design of the systems disclosed herein also reduces the radiation resistance in the coils, because of the insulating strategy implemented. For receive coil 140, use of an insulating hemispherical covering 210 larger than receive coil 140 reduces the radiation resistance well below the AC resistance. It should be recognized that trade-offs in design between the insulating sphere radius, loop size, needed inductance, and overall footprint will need to occur to determine an optimal design for specific performance requirements. Further, the insulation strategy in conjunction with the potting process further protects the coils from the ocean saltwater and protects the overall operation of the system at underwater depth.

The embodiments of the system disclosed herein are beneficial to unmanned underwater vehicle developers who could save tremendous hardware and software development costs by avoiding the need for vehicle specific autonomous docking structures and software, as well as manned vehicle operators who would no longer need to execute precise vehicle maneuvering each time wireless charging is desired, or else risk charging inefficiencies which would make charging times longer.

Many modifications and variations of the Closed Magnetic Wireless Power Transfer System are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A system comprising:

an insulated transmit coil system comprising an insulated non-planar tapered transmit coil disposed within a tapered ferrite housing and a layer of insulating material surrounding the insulated non-planar tapered transmit coil and the tapered ferrite housing; and an insulated receive coil system, nested within the insulated transmit coil system, comprising a ferrite plug comprising a column portion centrally secured to a plate portion, a non-planar receive coil wound around the column portion, wherein the non-planar receive coil has a smaller diameter than the insulated non-planar tapered transmit coil, a layer of insulating material surrounding the column portion and the non-planar receive coil, and a hemispherical covering surrounding the insulated column portion and non-planar receive coil, wherein the maximum outside diameter of the hemispherical covering is less than or equal to the minimum inside diameter of the insulated non-planar tapered transmit coil, wherein the non-planar receive coil is positioned within the insulated non-planar tapered transmit coil, forming a closed magnetic circuit.

2. The system of claim 1, wherein the transmit coil system further comprises an electromagnetic shielding plate coupled to a distal end of the ferrite housing.

3. The system of claim 1, wherein the receive coil system further comprises an electromagnetic shielding plate coupled to a distal end of the plate portion.

4. The system of claim 1, wherein the insulated transmit coil system is operatively coupled to an underwater charging circuit.

5. The system of claim 4, wherein the insulated receive coil system is operatively coupled to an unmanned underwater vehicle.

6. The system of claim 1, wherein the insulated receive coil system is operatively coupled to an underwater sensor node.

7. The system of claim 6, wherein the insulated transmit coil system is operatively coupled to an unmanned underwater vehicle.

8. The system of claim 1, wherein the layer of insulating material surrounding the insulated non-planar tapered transmit coil and ferrite housing and the layer of insulating material surrounding the column portion and the non-planar receive coil each comprise a clear urethane material.

9. The system of claim 1, wherein the hemispherical covering comprises a high-pressure polymer material.

10. The system of claim 1, wherein a vertical midpoint of the non-planar receive coil is substantially aligned with a vertical midpoint of the insulated non-planar tapered transmit coil.

11. A system comprising:

an insulated transmit coil system comprising an insulated non-planar tapered transmit coil disposed within a tapered ferrite housing, a layer of insulating material surrounding the insulated non-planar tapered transmit coil and the tapered ferrite housing, and an electromagnetic shielding plate coupled to the distal end of the ferrite housing; and an insulated receive coil system, nested within the insulated transmit coil system, comprising a ferrite plug comprising a column portion centrally secured to a plate portion, a non-planar receive coil wound around the column portion, wherein the non-planar receive coil has a smaller diameter than the insulated non-planar tapered transmit coil, a layer of insulating material surrounding the column portion and the non-planar receive coil, an electromagnetic shielding plate coupled to the distal end of the plate portion, and a hemispherical covering surrounding the insulated column portion and non-planar receive coil, wherein the maximum outside diameter of the hemispherical covering is less than or equal to the minimum inside diameter of the insulated non-planar tapered transmit coil, wherein the non-planar receive coil is positioned within the insulated non-planar tapered transmit coil such that a vertical midpoint of the non-planar receive coil is substantially aligned with a vertical midpoint of the insulated non-planar tapered transmit coil, forming a closed magnetic circuit.

12. The system of claim 11, wherein the insulated transmit coil system is operatively coupled to an underwater charging circuit.

13. The system of claim 12, wherein the insulated receive coil system is operatively coupled to an unmanned underwater vehicle.

14. The system of claim 11, wherein the insulated receive coil system is operatively coupled to an underwater sensor node.

15. The system of claim 14, wherein the insulated transmit coil system is operatively coupled to an unmanned underwater vehicle.

16. The system of claim 11, wherein the layer of insulating material surrounding the insulated non-planar tapered transmit coil and ferrite housing and the layer of insulating material surrounding the column portion and the non-planar receive coil each comprise a clear urethane material.

17. The system of claim 11, wherein the hemispherical covering comprises a high-pressure polymer material.

* * * * *